US008214101B2

(12) United States Patent
Carlton et al.

(10) Patent No.: US 8,214,101 B2
(45) Date of Patent: Jul. 3, 2012

(54) SYSTEM AND METHOD FOR DETECTING MACHINE MOVEMENT AND SPEED SENSOR FAILURE

(75) Inventors: Douglas James Carlton, Peoria, IL (US); Corwin Eugene Storer, Bartonville, IL (US); Bradley John Will, Peoria, IL (US); Eric John Schultz, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1130 days.

(21) Appl. No.: 12/073,130

(22) Filed: Feb. 29, 2008

(65) Prior Publication Data
US 2009/0222162 A1 Sep. 3, 2009

(51) Int. Cl.
*G01M 17/00* (2006.01)
*G07C 5/00* (2006.01)
*B60Q 1/00* (2006.01)

(52) U.S. Cl. ............ 701/29.7; 701/29.8; 701/33.9; 701/34.4; 340/438

(58) Field of Classification Search ............ 701/29.1, 701/29.2, 29.7, 29.8, 30.4, 33.6, 33.9, 34.4, 701/50; 340/438
See application file for complete search history.

(56) References Cited

U.S. PATENT DOCUMENTS

| | | | | |
|---|---|---|---|---|
| 4,100,794 A * | 7/1978 | Meixner | | 73/862.28 |
| 4,265,337 A * | 5/1981 | Dammeyer | | 187/224 |
| 4,395,905 A * | 8/1983 | Fujimori et al. | | 73/114.49 |
| 4,414,871 A * | 11/1983 | Trout | | 82/165 |
| 4,527,244 A * | 7/1985 | Graham et al. | | 700/186 |
| 4,564,916 A * | 1/1986 | Hori et al. | | 701/34 |
| 4,602,600 A * | 7/1986 | Akatsuka et al. | | 123/198 D |
| 4,759,212 A * | 7/1988 | Sawada et al. | | 73/115.02 |
| 4,947,325 A * | 8/1990 | Iwata et al. | | 701/33.6 |
| 5,140,305 A * | 8/1992 | Hurley | | 340/508 |
| 5,257,672 A * | 11/1993 | Ohtagaki et al. | | 180/249 |
| 5,371,487 A * | 12/1994 | Hoffman et al. | | 340/425.5 |
| 5,586,130 A * | 12/1996 | Doyle | | 714/815 |
| 5,896,083 A * | 4/1999 | Weisman et al. | | 340/438 |
| 5,922,038 A * | 7/1999 | Horiuchi et al. | | 701/29.2 |
| 5,964,813 A * | 10/1999 | Ishii et al. | | 701/35 |
| 6,011,461 A * | 1/2000 | Luper | | 340/441 |
| 6,256,594 B1 * | 7/2001 | Yamamoto et al. | | 702/185 |
| 6,266,594 B1 * | 7/2001 | Ishikawa | | 701/50 |
| 6,456,908 B1 * | 9/2002 | Kumar | | 701/19 |
| 6,480,771 B2 * | 11/2002 | Nishida et al. | | 701/34 |
| 6,516,255 B2 * | 2/2003 | Jager et al. | | 701/34 |
| 6,675,079 B2 * | 1/2004 | Kwon | | 701/31.1 |
| 6,834,221 B2 * | 12/2004 | Jager et al. | | 701/34 |
| 6,947,797 B2 * | 9/2005 | Dean et al. | | 700/79 |
| 7,072,748 B2 * | 7/2006 | Kwon | | 701/29.2 |

(Continued)

*Primary Examiner* — Darnell Jayne
*Assistant Examiner* — Sasha T Varghese
(74) *Attorney, Agent, or Firm* — Finnegan, Henderson, Farabow, Garrett & Dunner LLP

(57) ABSTRACT

A method for indirectly detecting a movement of a machine and a failure of a speed sensor is disclosed. The method may include receiving an operator input signal, and determining a first factor based on the operator input signal. The method may also include measuring a machine operation parameter, and determining a second factor based on the machine operation parameter. The method may further include identifying a movement of the machine if the first factor is out of a first threshold range and the second factor is out of a second threshold range for at least a first threshold length of time. The method may also include determining a speed sensor failure if the movement of the machine is identified and no speed is detected by the speed sensor for at least a second threshold length of time.

17 Claims, 4 Drawing Sheets

U.S. PATENT DOCUMENTS

| | | | |
|---|---|---|---|
| 7,110,868 B2 * | 9/2006 | An | 701/33.6 |
| 7,110,869 B2 * | 9/2006 | Tao et al. | 701/34 |
| 7,164,350 B2 * | 1/2007 | Ferrone et al. | 340/463 |
| 7,191,041 B2 * | 3/2007 | von Schwertfuehrer et al. | 701/34 |
| 7,286,917 B2 * | 10/2007 | Hawkins et al. | 701/34 |
| 2001/0027362 A1 | 10/2001 | Nishida et al. | |
| 2002/0091472 A1 * | 7/2002 | Jager et al. | 701/34 |
| 2003/0171861 A1 | 9/2003 | Kwon | |
| 2004/0201270 A1 | 10/2004 | Suzuki et al. | |
| 2005/0257977 A1 | 11/2005 | Kamiya | |
| 2005/0275519 A1 * | 12/2005 | Ferrone et al. | 340/463 |
| 2006/0021450 A1 * | 2/2006 | Nallapa | 73/862.326 |
| 2006/0025910 A1 | 2/2006 | Hayashi | |
| 2006/0095176 A1 | 5/2006 | Kim | |
| 2006/0191732 A1 * | 8/2006 | Lunzman et al. | 180/307 |
| 2006/0253236 A1 | 11/2006 | Hawkins et al. | |
| 2007/0005219 A1 * | 1/2007 | Muramatsu et al. | 701/100 |
| 2007/0050107 A1 | 3/2007 | Tanaka et al. | |
| 2007/0119136 A1 | 5/2007 | MacGregor et al. | |
| 2009/0111655 A1 * | 4/2009 | Hatanaka | 477/218 |
| 2009/0133951 A1 * | 5/2009 | Schultz et al. | 180/307 |

* cited by examiner

SYSTEM AND METHOD FOR DETECTING MACHINE MOVEMENT AND SPEED SENSOR FAILURE

TECHNICAL FIELD

This application relates to a system and method for detecting a machine movement, and more particularly, to a system and method for indirectly detecting a machine movement.

BACKGROUND

Motor speed sensors are widely used in a machine. Reliable and precise speed measurements are important for machine controls, such as traction control, wheel slide protection, registration, train control, door control, and so on. The electronic control module (ECM) of a machine typically includes an un-commanded motion detection (UCMD) function to detect faults and perform diagnostics on a motor speed sensor, when a fault is detected associated with the sensor. However, there is a potential that the motor speed sensor failure may not be successfully detected and notified to the operator. As a result, the undetected motor speed sensor failure may indirectly disable the UCMD function.

One instance of sensor detection failure occurs when an electrical wiring fault exists in a machine. For example, a parked machine experiences a sensor power supply line harness failure and stops supplying power to the motor speed sensor. When such a motor speed sensor failure occurs, the ECM may not receive a speed signal and may not know that the machine is moving. Accordingly, the ECM may not detect the motor speed sensor failure and the UCMD function may not be activated.

It is a regulatory requirement that an operator needs to be notified when a speed sensor fails and the failure detection (e.g., UCMD) ability is lost. Therefore, it becomes important to indirectly detect the machine movement when a motor speed sensor fails, to comply with the machine regulations. Additionally, it is also important to determine that the speed sensor detection function has failed and to notify the operator regarding the failure.

A method for calibrating the control output using a secondary reference in the event of speed sensor failure is described in U.S. Patent Publication No. 2007/0119136 to MacGregor et al. ("the '136 publication"). The '136 publication describes a technique called valve profiling. The technique calibrates the control output so that the control module has a secondary reference point as to how the pulse width modulation (PWM) valve should function in the event of a speed sensor failure. The method includes measuring set point PWM voltage/current values, and comparing the set point values with stored values in a look-up table. In the look-up table, the stored PWM voltage/current values may correspond to a set of speed sensor values. The method may further include determining a virtual speed based on the look-up table.

Although the technique described in the '136 publication may be effective for indirectly detecting machine movement, it may be problematic. For example, the calibration method described in the '136 publication requires that the ECM be able to measure reliable PWM voltage and current values to determine a motor speed. However, when un-commanded machine motion is present on a stopped machine, the PWM voltage/current values may not be accurately measurable, and consequently the virtual speed values obtained from the look-up table may not accurately indicate true motor speed values. In particular, the method described in the '136 publication may not be capable of detecting an un-commanded machine motion. Furthermore, although the method described in the '136 patent may indicate whether a fault exists on a speed sensor, it may be incapable of notifying an operator of the machine and activating diagnostics, once a motor speed sensor fault is detected.

The disclosed system and method for indirectly detecting machine movement is directed towards overcoming one or more of the shortcomings set forth above.

SUMMARY

In one aspect, a method for indirectly detecting a movement of a machine and a failure of a speed sensor is disclosed. The method may include receiving an operator input signal, and determining a first factor based on the operator input signal. The method may also include measuring a machine operation parameter, and determining a second factor based on the machine operation parameter. The method may further include identifying a movement of the machine if the first factor is out of a first threshold range and the second factor is out of a second threshold range for at least a first threshold length of time. The method may also include determining a speed sensor failure if the movement of the machine is identified and no speed is detected by the speed sensor for at least a second threshold length of time.

In another aspect, an indirect machine movement detection system for detecting a movement of a machine and a failure of a speed sensor is disclosed. The indirect machine movement detection system may include an operator input device configured to receive an operator input signal and a sensor configured to measure a machine operation parameter. The indirect machine movement detection system may further include a controller coupled to the operator input device and the sensor. The controller may be configured to receive the operator input signal from the operator input device and determine a first factor based on the operator input signal. The controller may be further configured to receive the machine operation parameter from the sensor and determine a second factor based on the machine operation parameter. The controller may also be configured to identify a movement of the machine if the first factor is out of a first threshold range and the second factor is out of a second threshold range for at least a first threshold length of time. The controller may be further configured to determine a speed sensor failure if the movement of the machine is identified and no speed is detected by the speed sensor for at least a second threshold length of time.

DETAILED DESCRIPTION

Figure 1:
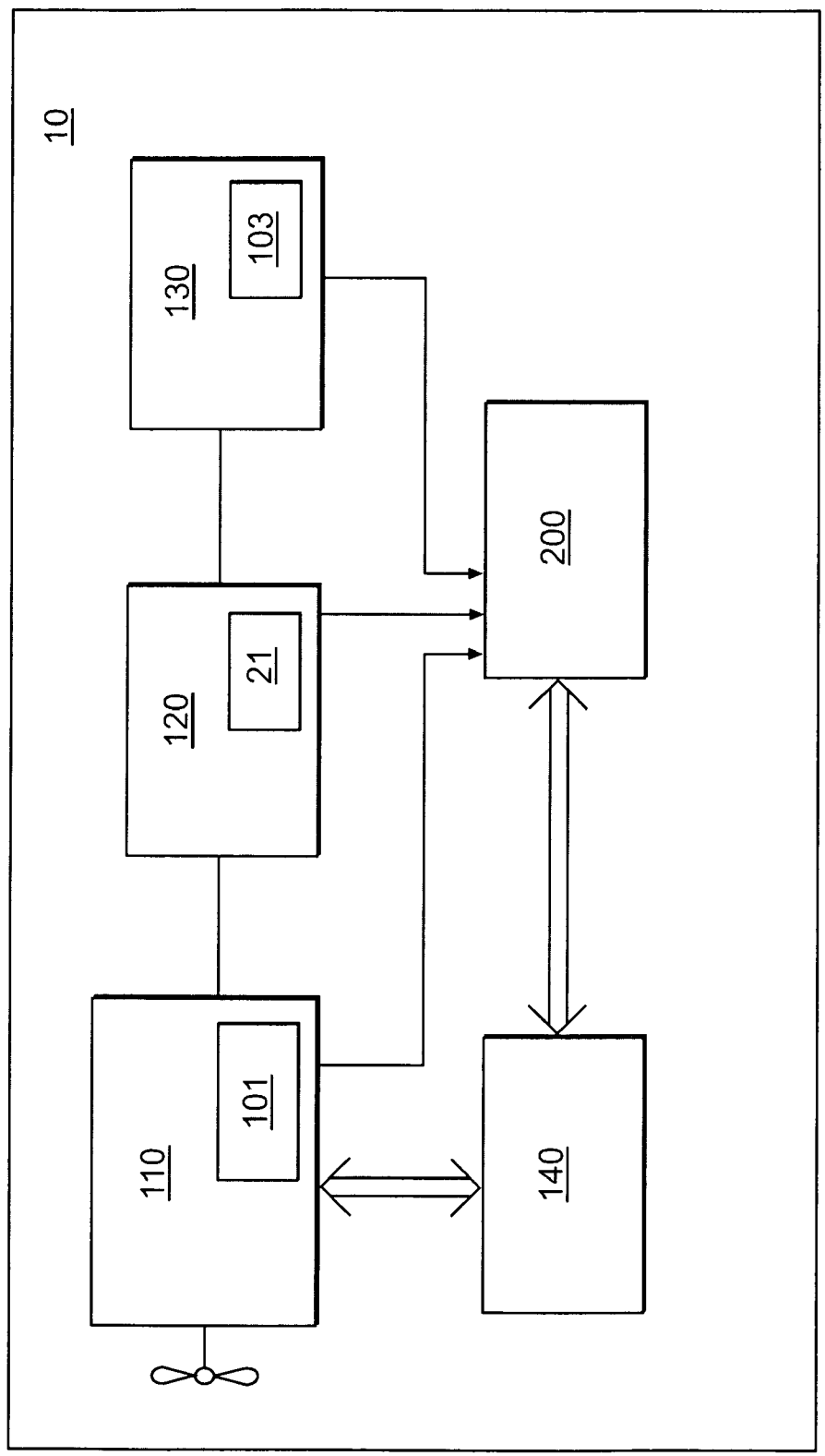
FIG. 1 provides a block diagram of a machine, in accordance with an exemplary embodiment of the present disclosure.

FIG. 1 provides a block diagram of a machine 10, in accordance with an exemplary embodiment of the present disclosure; Machine 10 may include, among other things, a power source 110, a traction system 120, a transmission system 130, an ECM 140, and an indirect machine movement detection system 200. Machine 10, as the term is used herein, refers to a fixed or mobile machine that may perform some type of operation associated with a particular industry, such as mining, construction, farming, etc., and that operates between or within work environments. Examples of machines include trucks, cranes, earth moving vehicles, mining vehicles, backhoes, material handling equipment, farming equipment, marine vessels, and on-highway vehicles.

Power source 110 may include various components configured to provide electric power for use by one or more systems of machine 10. For example, power source 110 may include an engine 101, a generator and a power electronic system. Engine 101 may be any appropriate type of engine that generates power for machine 10, such as an internal combustion engine.

Traction system 120 may be electrically coupled to power source 110. Traction system 120 may include at least one load. One example of the load may be an electric motor, such as an AC induction motor, a brushless DC motor, a variable or switched reluctance motor, a stepper motor, a linear motor, or any other type of motor. Traction system 120 may provide mechanical power to move machine 10. For example, one or more of the motors may be connected to the wheels of machine 10 and drive the movement of machine 10. Each motor may include a motor speed sensor 21 to measure the motor speed that is associated with the wheel speed. Measurement from motor speed sensor 21 may indicate whether machine 10 is moving or stopped.

Machine 10 may also include a transmission system 130 connected to traction system 120. Transmission system 130 may provide a torque-speed conversion (also known as gear reduction or speed reduction) from a higher speed motor to a slower but more forceful output. Transmission system 130 may have the ability to select one of several different gear ratios. According to one embodiment, transmission system 130 may be a hydrostatic transmission system and may include a hydrostatic drive portion 103. When fluid enters hydrostatic drive portion 103, a hydrostatic pressure sensor (not shown) may monitor a pressure of the fluid. The pressure of the fluid entering hydrostatic drive portion 103 may be used to provide feedback to charge a pump for maintaining a desired pressure within a hydraulic system of machine 10.

ECM 140 may include any appropriate type of engine control system configured to perform engine control functions such that engine 101 may operate properly. ECM 140 may include any number of devices, such as microprocessors or microcontrollers, memory modules, communication devices, input/output devices, storage devices, etc., to perform such control functions. Further, computer software instructions may be stored in or loaded to ECM 140. ECM 140 may execute the computer software instructions to perform various control functions and processes.

ECM 140 may also control other systems of machine 10, such as traction system 120 and/or transmission system 130, etc. Multiple ECMs may be included in ECM 140 or may be used on machine 10. For example, a plurality of ECMs may be used to control different systems of machine 10 and also to coordinate operations of these systems. Further, the plurality of ECMs may be coupled together via a communication network to exchange information. Information such as input parameters, output parameters, parameter values, and status of control systems may be communicated to the plurality of ECMs simultaneously.

ECM 140 may be configured to communicate with traction system 120 to obtain a motor speed measurement from motor speed sensor 21 built into traction system 120. ECM 140 may include a function for detecting un-commanded machine motions. When a fault is detected on the sensor, this UCMD function may be activated and diagnostics may be performed on the failed motor speed sensor 21. However, there is a potential that the motor speed sensor failure may not be successfully detected and the UCMD function may not be operative. For example, when a stopped machine 10 experiences a failure on motor speed sensor 21 and then begins moving again, the UCMD function may be indirectly disabled without notifying the operator.

In order to indirectly detect a movement of machine 10 and determine a speed sensor fault when the UCMD function is disabled, machine 10 may include an indirect machine movement detection system 200. Indirect machine movement detection system 200 may be included in ECM 140. Alternatively, indirect machine movement detection system 200 may be external to ECM 140, for example, as part of a separate control system associated with machine 10.

Indirect machine movement detection system 200 may be coupled to power source 110, traction system 120, and transmission system 130, and configured to receive data and determine a plurality of factors based on the received data. Indirect machine movement detection system 200 may be further configured to compare these factors with respective threshold values, monitor the comparison results for a certain time period, and determine whether a movement is present on machine 10. Indirect machine movement detection system 200 may be further configured to monitor a motor speed measured by motor speed sensor 21 in traction system 120, and determine whether a fault occurs on motor speed sensor 21 based on the detection of the machine movement and reading of motor speed sensor 21. According to one embodiment, when a machine movement is detected and a speed sensor failure is identified, indirect machine movement detection system 200 may be configured to flag an un-commanded machine motion disabled event, notify an operator of machine 10, and perform a diagnostic on motor speed sensor 21.

Figure 2:
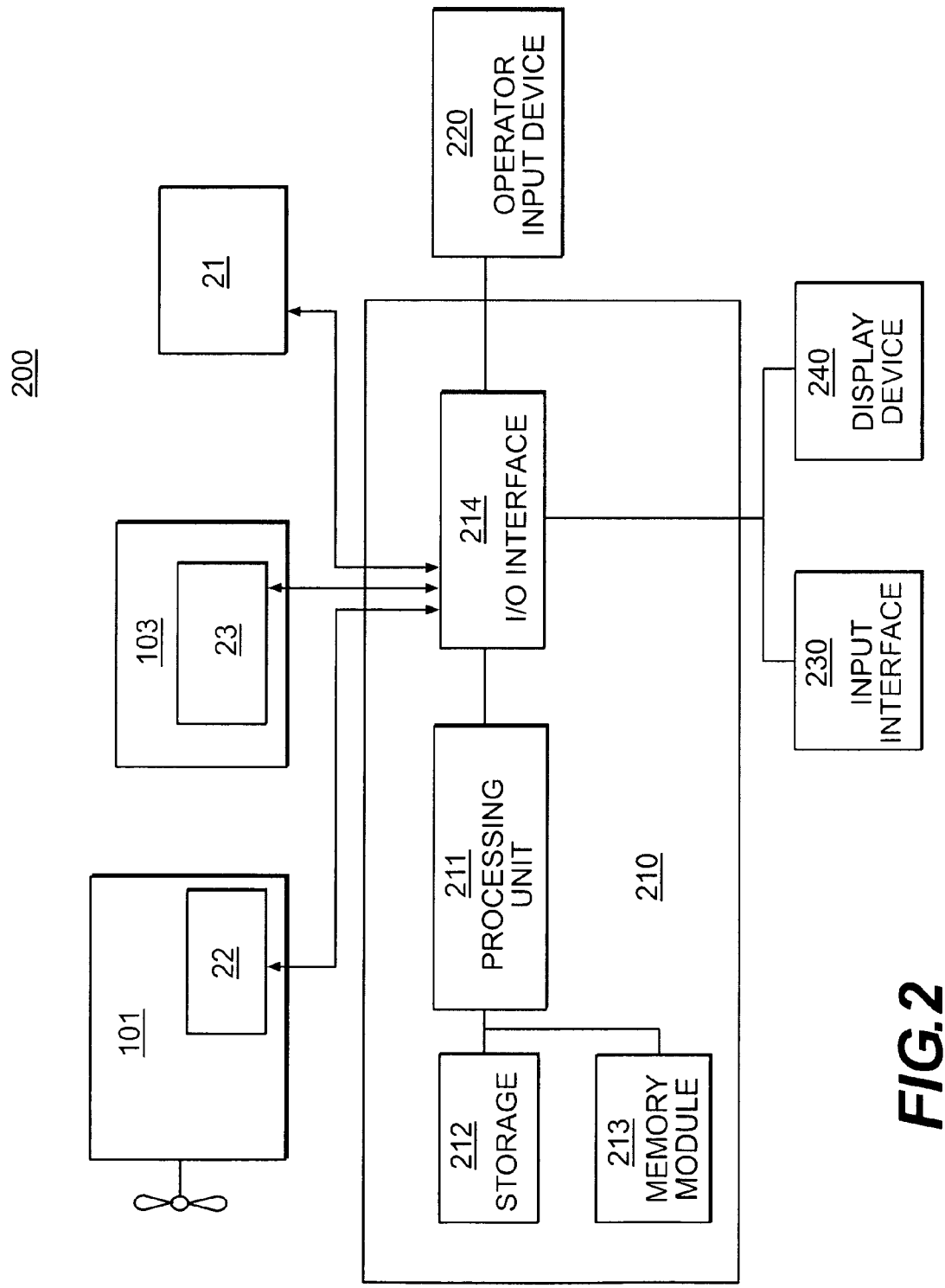
FIG. 2 provides a block diagram of an indirect machine movement detection system associated with a machine, in accordance with an exemplary embodiment of the present disclosure.

FIG. 2 provides a block diagram of indirect machine movement detection system 200 associated with machine 10, in accordance with an exemplary embodiment of the present disclosure. As illustrated in FIG. 2, indirect machine movement detection system 200 may include, among other things, a controller 210, an operator input device 220, an input interface 230, a display device 240, and a plurality of sensors including, for example, an engine speed sensor 22 and a hydrostatic pressure sensor 23. Engine speed sensor 22 may be configured to monitor and record a speed of engine 101, and send the engine speed to ECM 140 and/or controller 210. Hydrostatic pressure sensor 23 may be configured to monitor and record a fluid pressure in hydrostatic drive portion 103, and send the hydrostatic pressure to ECM 140 and/or controller 210.

Controller 210 may be coupled to motor speed sensor 21 and configured to detect a movement of machine 10 when motor speed sensor 21 fails. According to one embodiment, controller 210 may be coupled to an operator input device 220, such as a joystick or a brake pedal, and receive an operator input signal. Controller 210 may be further coupled to an input interface 230 to receive data inputs from an operator of machine 10. Controller 210 may also be coupled to a display device 240 to display the detection result and notify the operator.

Controller 210 may include, among other things, a processing unit 211, a storage unit 212, a memory module 213, and an I/O interface 214. These units may be configured to transfer data and send or receive instructions between or among each other.

Storage unit 212 may include any appropriate type of mass storage provided to store any type of information that processing unit 211 may need to operate. For example, storage unit 212 may include one or more hard disk devices, optical disk devices, or other storage devices to provide storage space. Memory module 213 may include one or more memory devices including, but not limited to, a ROM, a flash memory, a dynamic RAM, and a static RAM.

Both storage unit 212 and memory module 213 may be configured to store information used by processing unit 211. For example, storage unit 212 and/or memory module 213 may be configured to store threshold values associated with one or more operation performance factors determined by processing unit 211. Each threshold may be a value or a range of values. Each threshold may be in a form of absolute value or a percentage value. Storage unit 212 and/or memory module 213 may also be configured to store threshold time values used during the movement detection and sensor fault determination processes executed by processing unit 211. Storage unit 212 may be further configured to store look-up tables containing mapping relationships between operator input signals and operation performance factors, such as, for example, a mapping relationship between a brake pedal position and a pump command factor. Similarly, the look-up tables may also contain mapping relationships between sensor measurements and operation performance factors, such as, for example, a mapping relationship between an engine speed and a power management factor.

Further, I/O interface 214 may be configured to obtain data from various sensors or other components (e.g., motor speed sensor 21, engine speed sensor 22, hydrostatic pressure sensor 23, operator input device 220, input interface 230, and display device 240) and/or to transmit data to these components and to ECM 140.

Processing unit 211 may include any appropriate type of general purpose microprocessor, digital signal processor, or microcontroller. Processing unit 211 may be configured as a separate processor module dedicated to machine movement detection. Alternatively, processing unit 211 may be configured as a shared processor module for performing other functions unrelated to machine movement detection.

Processing unit 211 may be configured to communicate with I/O interface 214 to obtain operator input signals received from operator input device 220, and sensor measurements received from a plurality of sensors (e.g., engine speed sensor 22 and hydrostatic pressure sensor 23). Processing unit 211 may be further configured to determine a plurality of factors based on the operator input signals and sensor measurements. According to one embodiment, processing unit 211 may compute the factors according to programmed algorithms. Alternatively, processing unit 211 may communicate with storage unit 212 and "look-up" the factors according to the mapping relationships stored in the look-up tables.

Processing unit 211 may be further configured to compare the determined factors with threshold values, and monitor the comparison results for at least a threshold time. Processing unit 211 may identify the presence of a machine movement if the factors are out of their respective threshold ranges for a period of time longer than the threshold time. Processing unit 211 may be configured to obtain the threshold values and threshold time values from storage unit 212 or memory module 213.

Processing unit 211 may also be configured to determine a fault on motor speed sensor 21 if a machine movement is identified, but no speed reading from motor speed sensor 21 is detected for at least a second threshold time. If a fault is detected on motor speed sensor 21, processing unit 211 may be further configured to communicate with I/O interface 214 to send a notification to the operator of machine 10. Processing unit 211 may also be configured to communicate with ECM 140 via I/O interface 214 to flag an un-commanded machine motion disabled event and activate an UCMD diagnostic on motor speed sensor 21.

Operator input device 220 may be any device that accessible by the operator of machine 10 to input a control signal. For example, operator input device 220 may be a joystick, a brake pedal, etc. Operator input device 220 may be configured to receive the control signal and transmit the signal to one or more systems of machine 10 to adjust the operation of these systems. For example, the operator may shift a joystick according to his desired gear ratio. The position of the joystick may become an operator input signal and may be transmitted to transmission system 130 as an indication of operator desired gear ratio. This input signal may be mapped to a pump command that corresponds to a pump displacement. The operation of transmission system 130 may be adjusted accordingly to realize the operator desired gear ratio. Operator input device 220 may also be configured to send the operator input signals to ECM 140 and/or controller 210.

Input interface 230 may be a computer, an operator console, or a handheld operator panel. Input interface 230 may be coupled to controller 210 via communication cables, wireless networks, or other communication mediums. Input interface 230 may include graphic interface for user input. Input interface 230 may include a keyboard, a switch, a mouse, and/or a touch screen. Input interface 230 may be configured to receive data input from users, and send the data input to controller 210 via I/O interface 214. For example, input interface 230 may also be configured to receive a user input profile having a plurality of threshold values and threshold time values.

Display device 240 may be, for example, a computer, an operator panel, or an LCD. According to one embodiment, display device 240 may be an integral part of input interface 230. Display device 240 may be coupled to controller 210 via communication cables, wireless networks, or other communication mediums. Display device 240 may be configured to receive and display a notification when a machine movement is detected and a motor speed sensor fault is identified. Display device 240 may further include an audio unit and provide an audible indication when a speed sensor failure is identified.

INDUSTRIAL APPLICABILITY

Although the disclosed embodiments are described in association with an indirect machine movement detection system as a backup detection strategy when the motor speed sensor has a fault and UCMD function in a machine fails, the disclosed detection system may be used in any environment where it may be desirable to indirectly detect a component failure when direct detection is not operative. Specifically, the disclosed detection system may be configured to receive a plurality of operator input signals and/or indirect measurements, and determine a plurality of operation performance factors based on these input signals and/or measurements. The disclosed detection system may then be configured to compare the determined factors with threshold values and monitor the comparison results for a threshold length of time. A fault may be identified if the factors are out of the threshold ranges for at least the threshold length of time. The disclosed detection system may also be configured to activate a diagnostic on the failed component and notify an operator of the failure.

Figure 3:
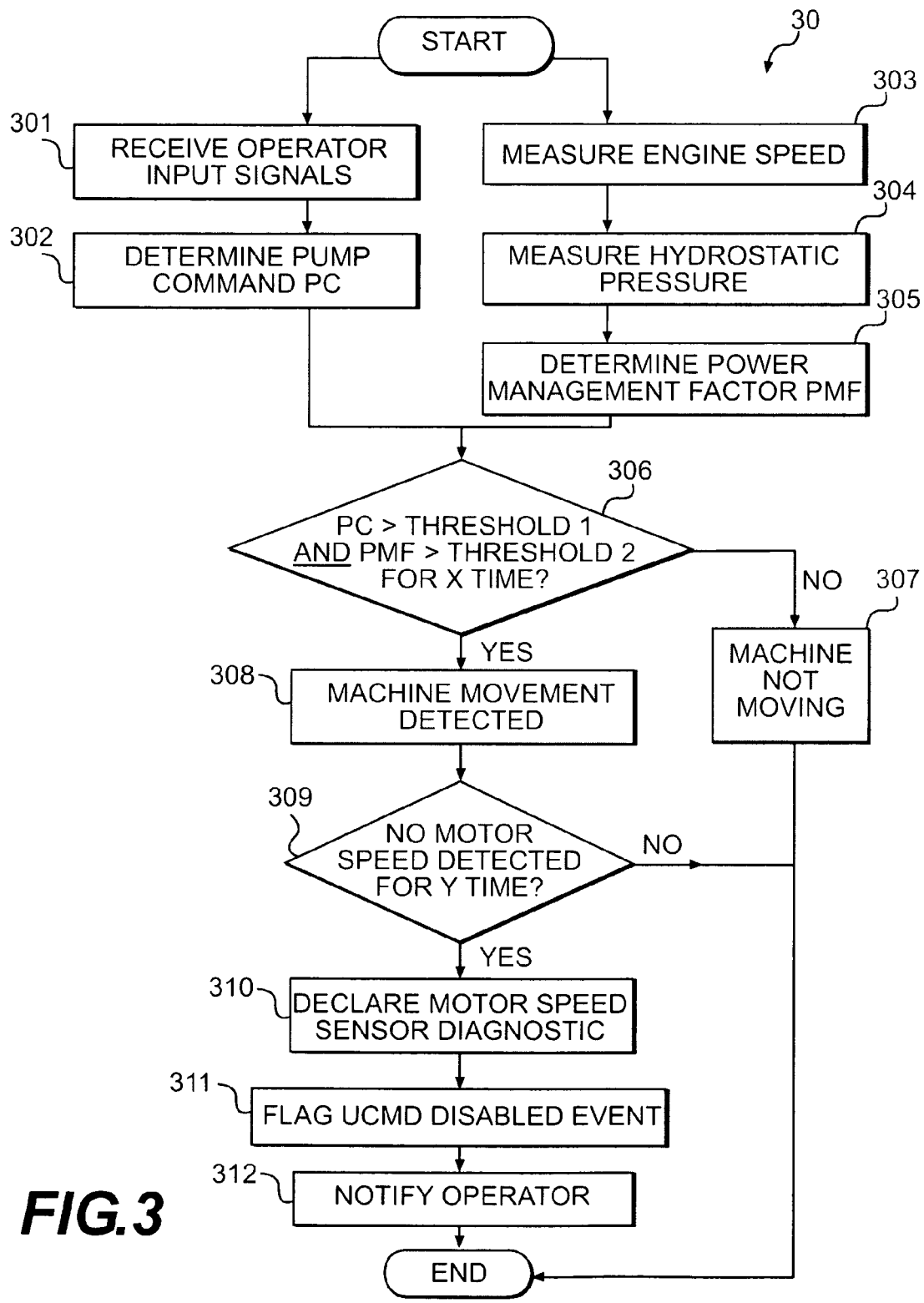
FIG. 3 provides a flowchart of a first exemplary process for indirectly detecting a machine movement and a failure of a speed sensor, in accordance with an exemplary embodiment of the present disclosure.

FIG. 3 provides a flowchart of a first exemplary process 30 for indirectly detecting a machine movement and a failure of a speed sensor, in accordance with an embodiment of the present disclosure. Process 30 may start when no motor speed is detected from motor speed sensor 21, and no active diagnostic exists on motor speed sensor 21 whose signal is used by the UCMD function in ECM 140. Controller 210 may be configured to receive an operator input signal from operator input device 220 via I/O interface 214 (Step 301). For example, controller 210 may receive the position of a joystick or a brake pedal, which indicates an operator desired gear ratio. Controller 210 may be further configured to determine a first factor based on the an operator input signal (Step 302). According to one embodiment, the first factor may be a pump command (PC). For example, controller 210 may determine an operator desired gear ratio based on the received position of a joystick or a brake pedal, and map the gear ratio to a PC based on a look-up table stored in storage unit 212. The PC may correspond to a pump displacement.

Controller 210 may be further configured to receive a machine operation parameter from the sensor. For example, controller 210 may receive an engine speed measurement from engine speed sensor 22 (Step 303) and a hydrostatic pressure measurement from hydrostatic pressure sensor 23 (Step 304). Controller 210 may be configured to determine a second factor based on the machine operation parameter (PMF) (Step 305). According to one embodiment, the second factor may be a power management factor. For example, controller 210 may determine the PMF based on the engine speed and the hydrostatic pressure. The PMF may be a scale factor taking values within the range of 0 and 1, and may be used to reduce the load on engine 101. For example, PMF may be multiplied by an operator desired gear ratio to reduce the pump command and subsequently, reduce hydrostatic load to prevent engine 101 from stalling in high load applications.

Controller 210 may be further configured to determine whether PC exceeds a first threshold value Threshold 1 and PMF exceeds a second threshold value Threshold 2 for at least a first threshold length of time X (Step 306). For example, controller 210 may compare PC with Threshold 1 and PMF with Threshold 2, and monitor the comparison result for X time. Threshold 1, Threshold 2 and time X may be input by an operator via input interface 230 and may be stored in storage unit 212. In one embodiment, Threshold 1 may be 0.3 gear ratio, Threshold 2 may be 0.9, and time X may be 0.2 seconds.

If PC exceeds Threshold 1 and PMF exceeds Threshold 2 for at least time X (Step 306: Yes), controller 210 may identify that a movement is present on machine 10 (Step 308). Otherwise (Step 306: No), controller 210 may identify that no movement is present on machine 10 (Step 307). When a movement is identified (Step 308), controller 210 may be configured to communicate with motor speed sensor 21 via I/O interface 214, and determine whether a motor speed is detected for at least a threshold length of time Y (Step 309). Time Y may be input by an operator via input interface 230 and may be stored in storage unit 212. In one embodiment, time Y may be 5 seconds.

If no speed is detected by the speed sensor for at least time Y (Step 309: Yes), controller 210 may determine that a speed sensor failure exists and declare a motor speed sensor diagnostic (Step 310). Otherwise (Step 309: No), controller 210 may determine that a speed sensor failure does not exist and terminate process 30. If a speed sensor failure is determined (Step 310), controller 210 may be further configured to communicate with ECM 140 and flag a UCMD disabled event (Step 311). Controller 210 may also be configured to notify the speed sensor failure to the operator of machine 10 via display device 240 (Step 312), after which process 30 may terminate.

Figure 4:
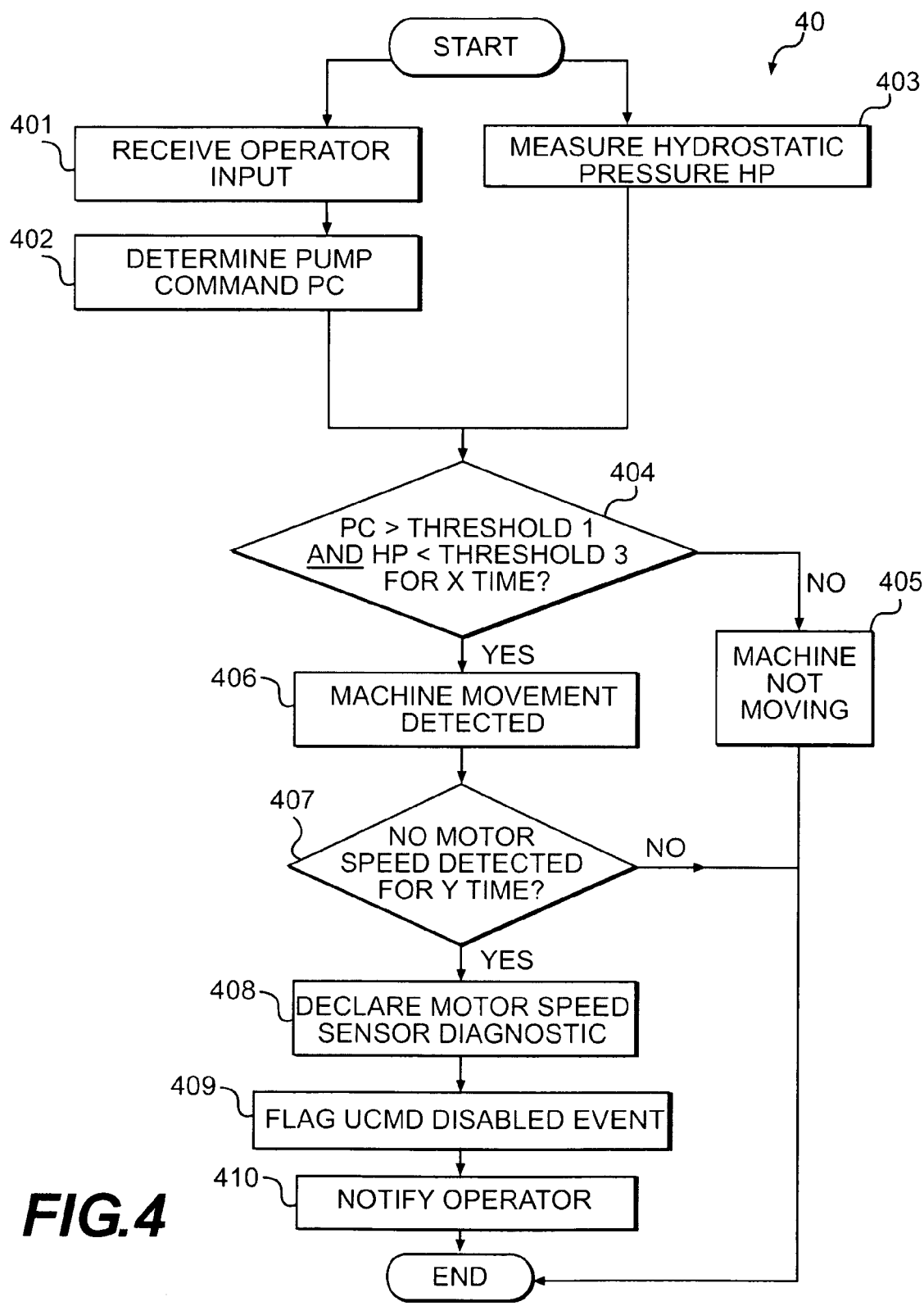
FIG. 4 provides a flowchart of a second exemplary process for indirectly detecting a machine movement and a failure of a speed sensor, in accordance with an exemplary embodiment of the present disclosure.

FIG. 4 provides a flowchart of a second exemplary process 40 for indirectly detecting a machine movement and a failure of a speed sensor, in accordance with an embodiment of the present disclosure. Process 40 may start when no motor speed is detected from motor speed sensor 21, and no active diagnostic is applied on motor speed sensor 21 whose signal is used by UCMD component in ECM 140. Controller 210 may be configured to receive an operator input signal from operator input device 220 via I/O interface 214 (Step 401), and determine a first factor based on the operator input signal (Step 402). According to one embodiment, the first factor may be a PC. Controller 210 may determine an operator desired gear ratio based on the received position of a joystick or a brake pedal, and map the gear ratio to a PC based on a look-up table stored in storage unit 212.

Controller 210 may be further configured to measure a machine operation parameter with a sensor. For example, controller 210 may receive a hydrostatic pressure (HP) measurement from hydrostatic pressure sensor 23 (Step 403). Controller 210 may be further configured to determine whether PC exceeds a first threshold value Threshold 1 and HP falls below a second threshold value Threshold 3 for at least a first threshold length of time X (Step 404). For example, controller 210 may compare PC with Threshold 1 and HP with Threshold 3, and monitor the comparison result for X time. Threshold 1, Threshold 3 and time X may be input by an operator via input interface 230 and may be stored in storage unit 212.

If PC exceeds Threshold 1 and HP falls below Threshold 3 for at least time X (Step 404: Yes), controller 210 may identify that a movement is present on machine 10 (Step 406). Otherwise (Step 404: No), controller 210 may identify that no movement is present on machine 10 (Step 405). When a movement is identified (Step 406), controller 210 may be configured to perform Steps 407-410, consistent with Steps 309-312 of process 30, consistent with the embodiment shown in FIG. 3.

Indirect machine movement detection system 200 in the present disclosure may provide increased reliability over conventional systems, such as the one disclosed in the '136 publication. For example, the indirect machine movement detection system 200 may indirectly identify machine movement when the UCMD function fails, using operator input signals and indirect mechanical sensor measurements. Therefore, the disclosed indirect machine movement detection system 200 may be operative when un-commanded machine motion is present on a stopped machine, while the technique described in the '136 publication may fail because electrical parameters indicative of speed sensor failure may not be accurately measurable. Furthermore, when a machine movement is detected and a speed sensor failure is identified, indirect machine movement detection system 200 may notify an operator of the machine and activate diagnostics on the failed speed sensor.

It will be apparent to those skilled in the art that various modifications and variations can be made to the disclosed indirect machine movement detection system 200 without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for detecting a movement of a machine and a failure of a speed sensor, the method being performed by a processor and comprising:
   receiving an operator input signal;
   determining a first factor based on the operator input signal, where the first factor is a pump command;
   measuring a machine operation parameter, where the machine operation parameter includes a hydrostatic pressure;
   determining a second factor based on the machine operation parameter;
   identifying a movement of the machine if, for at least a first threshold length of time, both (1) the first factor is out of a first threshold range and (2) the second factor is out of a second threshold range; and
   determining a speed sensor failure if the movement of the machine is identified and no speed is detected by the speed sensor for at least a second threshold length of time.

2. The method of claim 1, wherein determining the speed sensor failure further includes:
   flagging an un-commanded machine motion disabled event; and
   notifying the speed sensor failure to an operator of the machine.

3. The method of claim 1, wherein determining the speed sensor failure further includes performing a diagnostic on the speed sensor.

4. The method of claim 1, wherein the operator input signal includes a position of an operator input device.

5. The method of claim 1, wherein determining the first factor further includes:
   determining an operator commanded gear ratio; and
   mapping the operator commanded gear ratio to the pump command.

6. The method of claim 1, wherein the machine operation parameter includes an engine speed.

7. The method of claim 1, wherein the second factor is a power management factor.

8. The method of claim 1, wherein the first threshold range and the second threshold range are input by an operator of the machine via an input interface.

9. The method of claim 1, wherein the first threshold length of time and the second threshold length of time are input by an operator of the machine via an input interface.

10. A method for detecting a movement of a machine and a failure of a speed sensor, the method being performed by a processor and comprising:
    receiving an operator input signal;
    determining a power command based on the operator input signal;
    measuring a hydrostatic pressure associated with a hydrostatic drive portion of the machine;
    identifying a movement of the machine if, for at least a first threshold length of time, both (1) the power command exceeds a first threshold and (2) the hydrostatic pressure falls below a second threshold; and
    determining a speed sensor failure if the movement of the machine is identified and no speed is detected by the speed sensor for at least a second threshold length of time.

11. A machine movement detection system for detecting a movement of a machine and a failure of a speed sensor, comprising:
    an operator input device configured to receive an operator input signal;
    a machine operation sensor configured to measure a machine operation parameter; and
    a controller coupled to the operator input device and the machine operation sensor, and being configured to:
       receive the operator input signal from the operator input device;
       determine a first factor based on the operator input signal, where the first factor is a pump command;
       receive the machine operation parameter from the machine operation sensor;
       determine a second factor based on the machine operation parameter, where the second factor is a power management factor;
       identify a movement of the machine if, for at least a first threshold length of time, both (1) the first factor is out of a first threshold range and (2) the second factor is out of a second threshold range; and
       determine a speed sensor failure if the movement of the machine is identified and no speed is detected by the speed sensor for at least a second threshold length of time.

12. The machine movement detection system of claim 11, further including an input interface coupled to the controller, and being configured to receive the first threshold range, the second threshold range, the first threshold length of time, and the second threshold length of time, from an operator of the machine.

13. The machine movement detection system of claim 11, further including a display device coupled to the controller, and being configured to provide a notification to an operator when the speed sensor failure is determined.

14. The machine movement detection system of claim 11, wherein the controller is further configured to:
    flag an event in which un-commanded machine motion detection is disabled; notify an operator of the machine of the speed sensor failure; and
    perform a diagnostic on the speed sensor.

15. A machine, comprising:
    a power source;
    a speed sensor; and
    a machine movement detection system coupled to the speed sensor, wherein the machine movement detection system includes:
       an operator input device configured to receive an operator input signal;
       a machine operation sensor configured to measure a machine operation parameter, where the machine operation parameter includes a hydrostatic pressure; and
       a controller coupled to the operator input device and the machine operation sensor, and being configured to:
          determine a first factor based on the operator input signal, where the first factor is a pump command;
          identify a movement of the machine based on the first factor and the machine operation parameter measured by the machine operation sensor; and
          determine a speed sensor failure if the movement of the machine is identified and no speed is detected by the speed sensor for at least a threshold length of time.

16. The machine of claim 15, wherein the controller is configured to identify a movement of the machine by being configured to:
- receive the operator input signal from the operator input device;
- receive the machine operation parameter from the machine operation sensor;
- determine a second factor based on the machine operation parameter; and
- identify a movement of the machine if, for at least a first threshold length of time, both (1) the first factor is out of a first threshold range and (2) the second factor is out of a second threshold range.

17. The machine of claim 15, wherein the controller is further configured to:
- flag an event in which un-commanded machine motion detection is disabled;
- notify an operator of the machine of the speed sensor failure; and
- perform a diagnostic on the speed sensor.

* * * * *